United States Patent
Fwu et al.

(10) Patent No.: US 9,002,281 B2
(45) Date of Patent: Apr. 7, 2015

(54) APPARATUS AND METHOD TO ENABLE DEVICE-TO-DEVICE (D2D) COMMUNICATION IN CELLULAR NETWORKS

(71) Applicant: Intel Corporation, Santa Clara, CA (US)

(72) Inventors: Jong-Kae Fwu, Sunnyvale, CA (US); Alexey Khoryaev, Dzerzhinsk (RU); Mikhail Shilov, Nizhny Novgorod (RU); Apostolos Papathanassiou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 13/630,233

(22) Filed: Sep. 28, 2012

(65) Prior Publication Data

US 2013/0288608 A1    Oct. 31, 2013

Related U.S. Application Data

(60) Provisional application No. 61/640,404, filed on Apr. 30, 2012.

(51) Int. Cl.
*H04B 1/00* (2006.01)
*H04W 72/02* (2009.01)
*H04W 76/02* (2009.01)

(52) U.S. Cl.
CPC ............ *H04W 72/02* (2013.01); *H04W 76/023* (2013.01)

(58) Field of Classification Search
USPC .............. 455/63.1, 63.2, 67.11, 67.13, 422.1, 455/423, 424, 500, 501, 550.1, 552.1, 455/553.1; 370/328, 329, 338
See application file for complete search history.

(56) References Cited

U.S. PATENT DOCUMENTS

| | | | |
|---|---|---|---|
| 2009/0190541 A1* | 7/2009 | Abedi | 370/329 |
| 2010/0009675 A1 | 1/2010 | Wijting et al. | |
| 2011/0151790 A1 | 6/2011 | Khandekar et al. | |
| 2011/0282989 A1* | 11/2011 | Geirhofer et al. | 709/224 |

FOREIGN PATENT DOCUMENTS

| | | |
|---|---|---|
| KR | 102010013515 A | 12/2010 |
| WO | WO-2013165834 A1 | 11/2013 |

OTHER PUBLICATIONS

"International Application Serial No. PCT/US2013/038354, International Search Report mailed Aug. 13, 2013", 5 pgs.

(Continued)

*Primary Examiner* — Nhan Le
(74) *Attorney, Agent, or Firm* — Schwegman Lundberg & Woessner, P.A.

(57) ABSTRACT

An apparatus and method of allowing user equipment to transmit information directly with other user equipment, using a device-to-device mode is disclosed herein. A device-to-device blank subregion is defined where device-to-device information can be transmitted without interference from other user equipment. The device-to-device blank subregion may be set up such that it is only used in an exclusive mode if a device-to-device cluster is considered highly interfering. A device may join a device-to-device network through the use of a beacon transmission interval, a control transmission interval, and a data transmission interval.

10 Claims, 4 Drawing Sheets

(56) References Cited

OTHER PUBLICATIONS

"International Application Serial No. PCT/US2013/038354, Written Opinion mailed Aug. 13, 2013", 10 pgs.

Ericsson, et al., "Almost Blank Subframes and IDLE mode operation", R2-114503, 3GPP TSG-RAN WG2 #75, (Aug. 2011), 3 pgs.

"International Application Serial No. PCT/US2013/038354, International Preliminary Report on Patentability mailed Nov. 13, 2014", 12 pgs.

* cited by examiner

APPARATUS AND METHOD TO ENABLE DEVICE-TO-DEVICE (D2D) COMMUNICATION IN CELLULAR NETWORKS

CROSS-REFERENCE TO RELATED APPLICATIONS

This application claims priority under 35 U.S.C. §119(e) to U.S. Provisional Patent Application Ser. No. 61/640,404, filed Apr. 30, 2012, incorporated herein by reference in its entirety.

TECHNICAL FIELD

Embodiments pertain to wireless communications. Some embodiments pertain to wireless communications directly between two or more pieces of user equipment.

BACKGROUND ART

User Equipment (UE), including mobile devices such as phones, tablets, e-book readers, laptop computers, and the like, have become increasingly common. Accompanying the increase of usage of such devices has been an increase in the usage of proximity-based applications and services. Proximity-based applications and services are based on the awareness that two or more devices/users are close to one another and desire to communicate to each other. Exemplary proximity-based applications and services include social networking, mobile commerce, advertisement, gaming, and the like. In the current art, such applications and services use traditional mobile broadband networks. Such mobile broadband networks may not result in the best performance, for both the network and for the UE.

DESCRIPTION OF THE EMBODIMENTS

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies.

3GPP-LTE is based on a radio-interface incorporating orthogonal frequency division multiplex (OFDM) techniques. OFDM is a digital multi-carrier modulation format that uses a large number of closely-spaced orthogonal subcarriers to carry respective user data channels. Each subcarrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

In an exemplary situation in which proximity-based applications are used, a user with a mobile device, or user equipment (UE1) becomes physically close to another mobile device, UE2. A user may wish to transfer files, play a game, or otherwise communicate to UE2 from UE1. The connection between UE1 and UE2 may be automatically initiated by an application, instead of initiated by a user. In a traditional communications network, such a communication commonly occurs through a central coordinator, such as a base transceiver station, a Node B, or an Evolved Node B (eNodeB or eNB).

However, there are several factors that may make proximity-based communication different. For example, the distance between devices is commonly small and the communication may be application-driven, rather than user-initiated (e.g., applications that automatically communicate when a second device running the same application is in proximity). There are aspects of such proximity-based communications that could be optimized.

Figure 1:
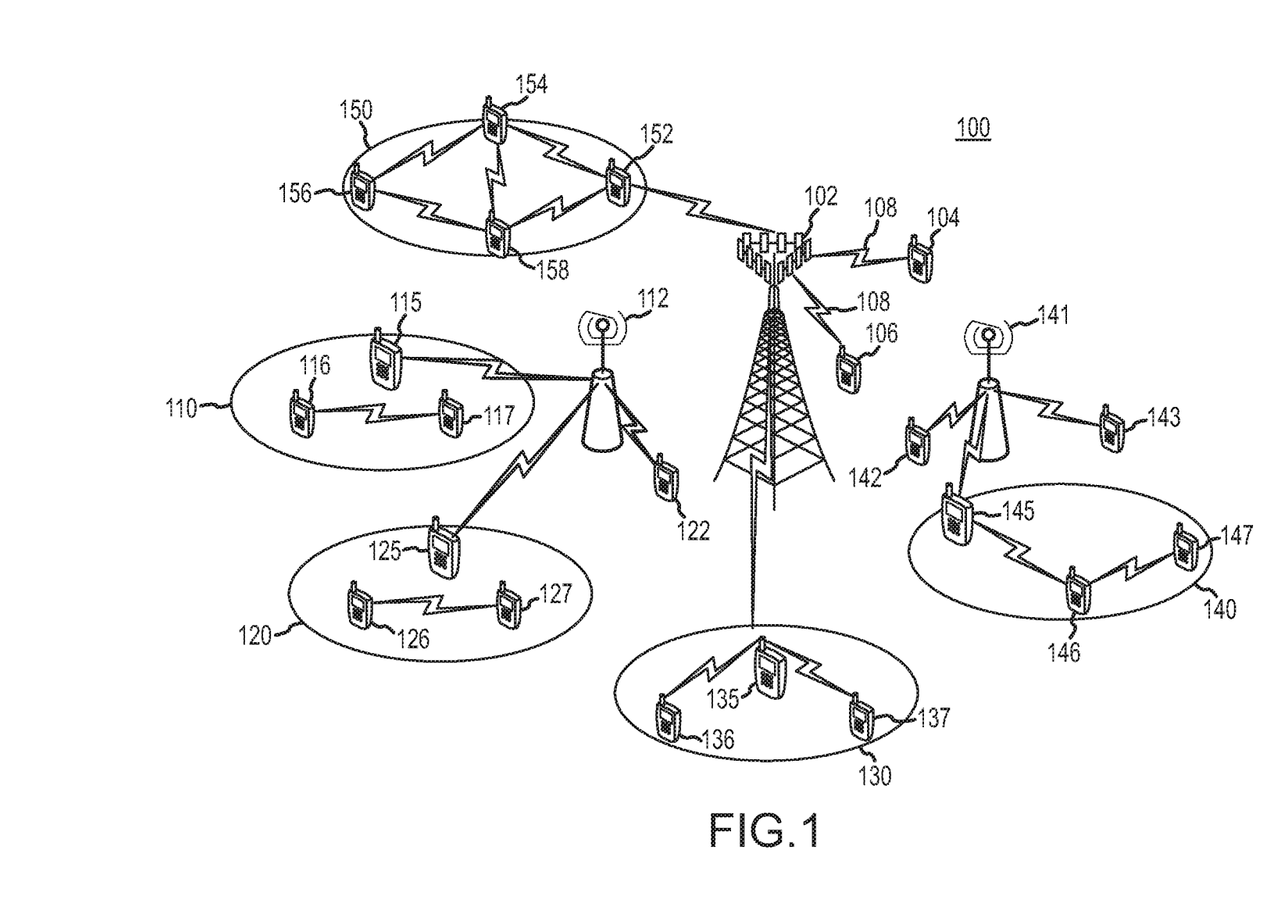
FIG. 1 is an illustrated overview of an embodiment of the present invention.

FIG. 1 illustrates a system that combines a Device-to-Device ("D2D") network with a wireless access network, such as a Long Term Evolution (LTE) network. Mobile broadband network 100 includes a central coordinator, illustrated here as eNB 102. User equipment (UE) 104 and 106 communicate with eNB 102 via LTE communications channel 108.

Also illustrated in FIG. 1 are D2D clusters 110, 120, 130, 140, and 150. Each of the D2D clusters comprises a plurality of UEs that are capable of communicating with each other, without the need to communicate through eNB 102. In FIG. 1, several different layouts of D2D clusters are shown. It should be understood that other configurations of D2D clusters are also possible. It should also be understood that a single eNB can support many more D2D clusters than are shown in FIG. 1.

Pico eNB 112 is coupled to eNB 102. Coupled to pico eNB 112 are D2D clusters 110 and 120. Within D2D cluster 110 is a D2D coordinator 115 and UEs 116 and 117. D2D coordinator 115 serves to manage the communications between UEs 116/117 and pico eNB 112. Within D2D cluster 120 is a D2D coordinator 125 and UEs 126 and 127. Also coupled to pico eNB 112 is a UE 122. UE 122 is not coupled to D2D clusters 110 or 120.

UEs 116 and 117 have a D2D connection with each other, where communications between UE 116 and UE 117 need not involve either pico eNB 112 or eNB 102. Instead, information is transmitted directly between UE 116 and UE 117. This set-up provides a variety of advantages. For example, because UE 116 and UE 117 are in close proximity to each other, they do not have to transmit data all the way to eNB 102—therefore, one or both devices can use a low-power transceiver mode, prolonging the battery lives of UE 116 and 117. In addition, because eNB 112 and eNB 102 are not involved in transmissions between UE 116 and UE 117, the finite bandwidth capabilities of eNB 102 and pico eNB 112 are not used. If either UE 116 or UE 117 needs to communicate to eNB 102 or pico eNB 112, such a communication occurs through D2D coordinator 115. Although FIG. 1 illustrates several scenarios that involve the use if a D2D coordinator, it should be understood that communication between devices may be performed without any D2D coordinator, directly under the control of an eNB, such as eNB 102 or pico eNB 112. In such a situation, three devices only occupy the space that would otherwise be used by three devices. A similar configuration is present in D2D cluster 120, between UE 126 and UE 127. It should be understood that there is a connection between D2D coordinator and UEs 116 and 117, it is merely omitted from FIG. 1.

D2D cluster 130 comprises D2D controller 135, UE 136, and UE 137. In D2D cluster 130, UEs 136 and 137 may communicate directly with each other and with D2D controller 135. D2D 135 serves to control the D2D connection between UE 136 and UE 137. D2D 135 may also organize multicast/broadcast transmissions with UE 136 or UE 137. As above, UEs 136 and 137 and D2D coordinator 135 free up the bandwidth of eNB 102 by using the same space as a single traditional UE. Unlike D2D clusters 110 and 120, there is no pico eNB coupled to D2D cluster 130.

D2D cluster 140 comprises pico eNB 141, UEs 142 and 143; D2D controller 145; and UEs 146 and 147. UEs 142 and 143 are coupled to pico eNB 141, but are not coupled to any other UEs. D2D controller 145 is also coupled to pico eNB 142. UEs 146 and 147 are in a multi-hop configuration—only UE 146 is coupled to D2D controller 145. If pico eNB wants to send data to UE 146 it can send the data through D2D coordinator/controller UE 145. If D2D controller needs to send a signal to UE 147, the signal is transmitted first to UE 146.

D2D cluster 150 comprises UEs 152, 154, 156, and 158 coupled to each other in a mesh configuration, with each of the UEs 152, 154, 156, and 158 coupled to each other as illustrated. If a UE needs to send data to a UE it is not directly coupled to (e.g., UEs 152 and 156), it can send the data through a UE that it is connected to (e.g., UE 154). As with all connections illustrated in FIG. 1, a D2D controller is not necessary.

With D2D clusters 110, 120, 130, 140, and 150 each operating independently, eNB 102 does not have to handle as much traffic, thereby allowing eNB 102 to service more UEs than would otherwise be possible and/or provide higher throughput to other UEs. However, the presence of multiple D2D clusters could result in an increase in inter-cell interference.

D2D Resource Allocation

There are several methods that allow D2D clusters to operate with minimal interference with LTE networks. In one embodiment, various resources are dedicated to D2D operation. Types of resources that could be dedicated to D2D operation may include 1) a set of resource blocks within one carrier, 2) a set of frames or subframes, or 3) a combination of 1 and 2. One subset of resources may be allocated to D2D operation. The network, via an eNB, informs UEs that a set of resources is reserved for D2D operation. This reservation may occur through the use of signaling, broadcast messages, and the like. Thereafter, only D2D communications within the cell of a particular eNB use the reserved resource block. The result is less interference for the D2D clusters, which do not have to compete with eNB traffic in those resource blocks.

In another embodiment, resources are shared between regular LTE traffic and D2D transmissions. In this situation, D2D transmissions are supported on the same resources as traditional LTE resources. D2D transmissions can be allocated solely to downlink (DL) resources, solely to uplink (UL) resources, or to both DL and UL resources. The resources being shared need not be the entirety of available resources, it may only share a subset of the available cellular resources within the overlay LTE/D2D network. Examples of a subset of the available resources include a subset of carriers, frame/subframe, resource blocks, or combination of the above.

In another embodiment, both dedicated and shared resources may be allocated simultaneously and dynamically, depending on conditions. An advantage of this embodiment is that, as a UE changes location, the interference conditions change. Dynamic allocation of resources allows the UE to maintain the best possible connection possible, both to other UEs and to the eNB.

Support of D2D Transmission in the LTE Frame Structure

The LTE frame structure comprises ten subframes that may be of downlink (DL) or uplink (UL) transmission direction. Each subframe carries multiple data or control information and simultaneously serves transmissions to and from multiple terminals. In an embodiment of this invention, a reserved D2D transmission region is assigned by the network and transmitted via higher layer signaling or broadcasted using system information messages. A D2D transmission region is a set of LTE subframes or frames where D2D communication is supported. For the purposes of D2D communication, the whole subframe can be used or only part of the frequency resources (for example, pre-configured physical resource blocks) within the subframe can be assigned. Those resources may be shared or dedicated as described above.

The D2D transmission region itself may contain multiple D2D operation zones or subregions with different functionality. Multiple D2D operation zones/subregions can be allocated and serve different purposes, including but not limited to: for support of device discovery, channel quality measurements, proximity sensing, data transmission, connection to a D2D controller/coordinator, channel access, and other functions.

The structure of a D2D transmission region may be consequently repeated in time similar to the current LTE frame based transmission concept. The D2D operation zone/subregion and its D2D subframes may reuse the existing physical structure of LTE subframes. In addition, the D2D operation zone and its D2D subframes may additionally carry the signals that are used for synchronization, channel estimation, and channel quality measurements as well as beacon transmissions for proximity sensing and device discovery procedures.

D2D Device Discovery

It would also be desirable for a D2D device to become aware of other D2D devices that are in close proximity. There are several possible D2D discovery mechanisms: (1) network assisted D2D discovery; (2) autonomous D2D mutual discovery; and (3) hybrid D2D discovery using (1) and (2).

In network-assisted D2D discovery, a UE sends a message to an eNB, notifying the eNB that it is capable of D2D transmission and wishes to engage in D2D transmission. The eNB can then transmit a message to the UE with information regarding other UEs that also want to engage in D2D transmission.

In autonomous D2D mutual discovery, a UE broadcasts a message indicating that it wants to engage in D2D transmission. A neighboring UE receives the message and initiates the D2D session. This message can be restricted to a UE that meets certain criteria. For example, the message could be restricted to a particular UE or a set of UEs that meet a certain criteria. By restricting the message to specific UEs or sets of UEs, the situation where too many UEs attempt to establish a D2D connection is avoided.

Additional signaling, such as a D2D beacon, may need to be introduced in order to support the D2D discovery procedure. When introduced, the D2D region may include both D2D data and D2D beacon subregions. In one embodiment, the D2D transmission region may have a beacon transmission interval ("BTI"), where discovery of stations occurs and where terminals perform one or more beacon transmissions. The beacon transmission may use the existing LTE reference signals such as sounding reference signals, demodulation reference signals, random access channel or use the signals specifically designed for proximity sensing and device discovery. The beacon transmission may be followed by a control transmission interval ("CTI") where control and management information between a D2D coordinator and D2D devices or between D2D devices is transmitted. The remaining part of the D2D transmission region may include a data transmission interval ("DTI") that may have contention-based access periods and data exchange periods.

Figure 2:
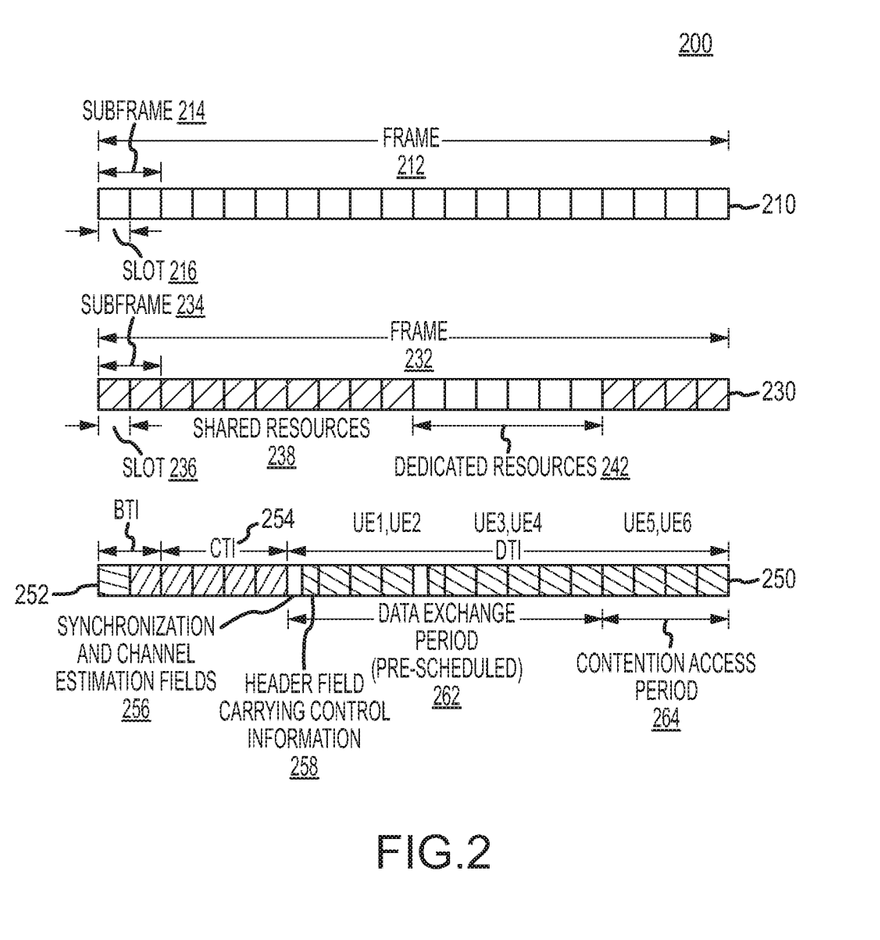
FIG. 2 illustrates a proposed frame structure of one embodiment.

FIG. 2 illustrates a D2D region example for FDD mode assuming that one D2D region occupies the whole frame of UL carrier. It also shows one embodiment of BTI, CTI and DTI allocations. Note that the size of D2D region and internal zones is subject to higher layer configuration and may be different from those shown in FIG. 2.

Frame 210 illustrates a regular frame structure. It consists of frame 212 and multiple subframes 214, which are made up of one or more slots 216. Frame 230 illustrates an embodiment of an uplink frame using shared resources. Frame 230 contains shared resources 238 and dedicated resources 242. Shared resources 238 are those that are shared among all UEs serviced by a particular eNB. Dedicated resources 242 are those used only for D2D services.

Frame 250 illustrates another embodiment of an uplink frame showing several intervals: beacon transmission interval 252; control transmission interval 256; and data transmission interval 260. Data transmission interval 260 may comprise a variety of different fields, including a header field 258 that contains control information. As described above, data transmission interval 260 may contain a data exchange period 262 and a contention access period 264.

Figure 3:
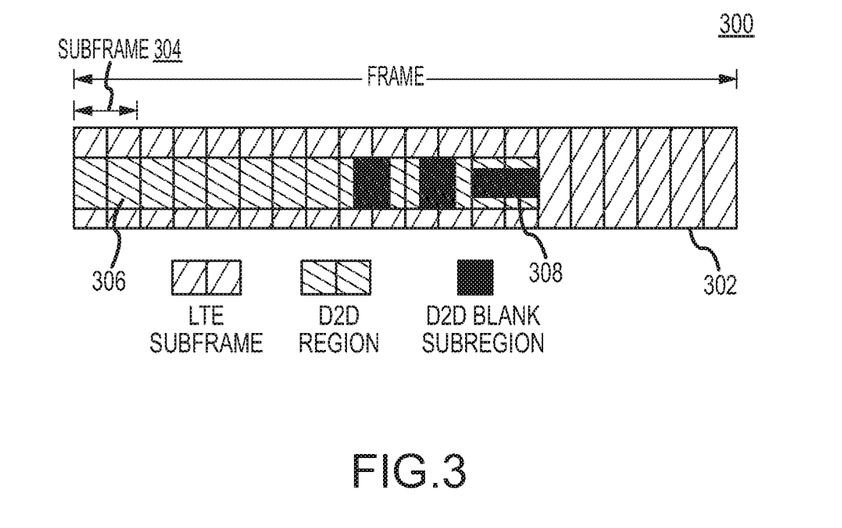
FIG. 3 illustrates a proposed frame structure of another embodiment.

FIG. 3 illustrates another exemplary frame structure. In frame structure 300, the D2d region is allocated in a set of subframes of the LTE frame. LTE frame 302 contains several LTE subframes 310, a D2D region 306, and a D2D blank subregion 308. It should be understood that the frame structures illustrated in FIGS. 2 and 3 are merely exemplary and can be replaced by other frame structures.

D2D RAT and LTE PHY Layer Transmission Scheme

The D2D operation may be implemented using the LTE Radio Access Technology ("RAT") or using another RAT operating under some control from the LTE network (e.g., LTE may provide network assisted initial D2D connection information, network assisted handover, and the like) in the same spectrum.

Although several of the embodiments described in this specification refer to LTE RATs, the embodiments may be generalized to other RATs, such as WiFi. Assuming that LTE-based D2D equipment has similar complexity and performs similar functions with a traditional UE terminal, orthogonal frequency-division multiple access (OFDMA) or single-carrier frequency-division multiple access (SC-FDMA) schemes may be used for transmission on a D2D link. Because of the asymmetric PHY design in LTE (OFDMA in DL vs. SC-FDMA in UL), a D2D device in an LTE network may be configured to support both modulation schemes, e.g., using SC-FDMA to communicate with the eNB and using OFDMA or SC-FDMA to communicate with a D2D link or vice versa. Additional signaling may be introduced to facilitate synchronization and D2D link channel quality measurements. From the UE device simplification point of view the reuse of OFDMA modulation receiver may have certain advantages since all UEs already use this modulation at the receiver side. To perform D2D link adaptation the existing LTE mechanisms (R8-R11) for channel quality measurements can be reused. Insertion of additional training signal (preamble) may be added before data transmission on D2D link to perform synchronization and channel estimation.

D2D Connection Establishment

Link establishment between devices in a D2D cluster may be performed with the assistance of the serving eNB or tinder control of a special D2D coordinator. The functions of a D2D coordinator may either be performed by a legacy UE terminal or a dedicated D2D coordinator. The D2D coordinator may perform one or more of the following functions: 1) organization of D2D clusters where multiple D2D links may be established and multiplexed; 2) coordination of transmission on D2D links within a D2D cluster; 3) coordination of transmission with the serving cell (eNB); 4) D2D connection establishment in the proximity area; and 5) broadcasting/multicasting and data hopping (relaying) to D2D cluster nodes.

The establishment of D2D links may be done by redirecting control-plane messages to the network through the eNB and/or by carrying user-plane messages directly to the D2D link established between a pair of peer devices (peer-to-peer data transmission).

D2D Clustering and Spatial Reuse

Multiple D2D clusters within a cell area may be established by the serving eNB relying on spatial reuse. In other words, D2D clusters that are distant from each other can use the same resources, even if those D2D clusters are served by the same eNB. Those D2D clusters can simultaneously operate in one D2D transmission region or different regions or resources within one region may be assigned by the serving eNB to each cluster. The operation within a D2D cluster may be controlled either by the D2D coordinator or directly by the serving eNB. An advantage of using multiple clusters is that cell spectral efficiency can be improved, especially if inter-cluster interference is low or control led by the serving node. Cell area splitting in D2D clusters may also potentially minimize the impact on the performance of eNB to UE links by applying different geographical scheduling strategies at the serving eNB. Different D2D transmission modes may be allowed inside a D2D cluster, e.g., multi-hop, cluster broadcasting, multicasting, and unicasting.

Proximity Sensing and Device Discovery

For a UE to operate in D2D mode, there needs to be another UE with which to communicate. Thus, there needs to be a method for a UE to find other UEs. Proximity sensing methods may be implemented by the network through the monitoring of the UE attachment association to a particular cell or by using location based services and protocols. In addition to these traditional methods, new proximity-based functionality may be added to the functions of the D2D coordinator. For example, a special device-discovery zone may be allocated in the D2D transmission region where device-discovery signaling is used to assist in D2D cluster organization and D2D link establishment. The discovery zone may comprise one or more subframes dedicated to such signaling. For example, the discovery zone may comprise a beacon transmission interval, as described above.

Figure 4:
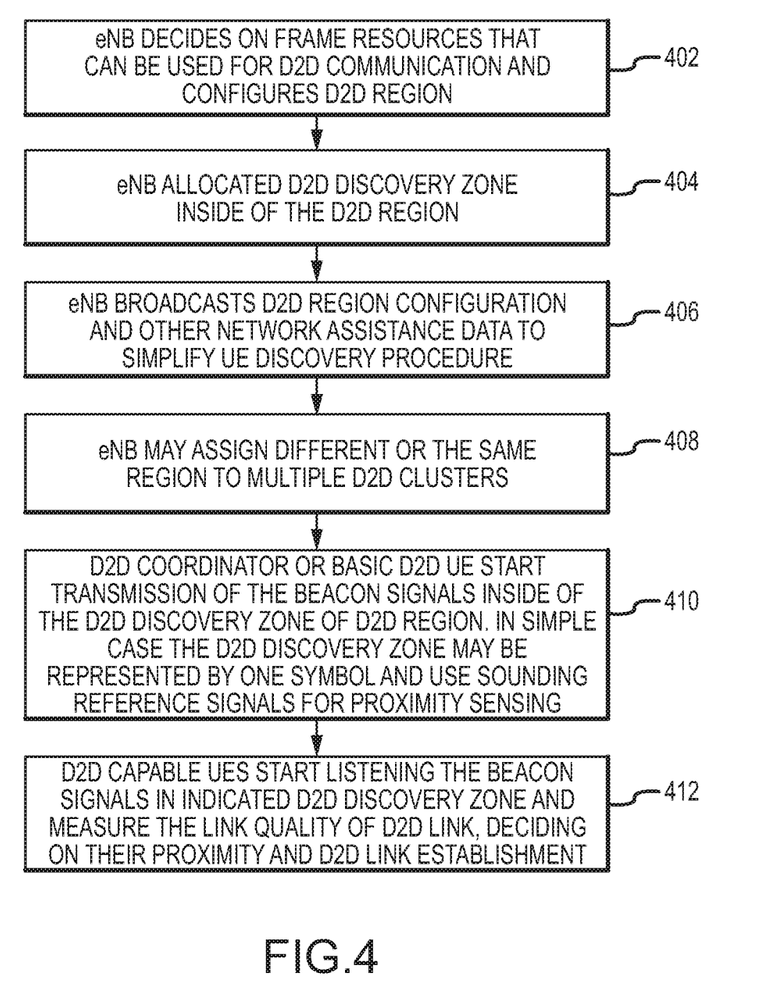
FIG. 4 is a flowchart showing the operation of an embodiment.

FIG. 4 is a flow diagram of one embodiment illustrating how a network can allocate a discovery zone for proximity sensing and discovery. At block 402, the evolved Node B allocates frame resources for use in D2D communication. The eNB then configures the D2D region. At block 404, within the D2D region, the eNB allocates a D2D discovery zone, which allows UEs to discover other UEs that are capable of operating in a D2D mode. At block 406, the eNB broadcasts the D2D region configuration information along with other network assistance data. This simplifies the discovery procedure for the UEs. At block 408, the eNB assigns regions to the D2D clusters. These may be different regions for each D2D cluster. At block 410, the eNB allows the D2D coordinator (if present) or the UEs to start the transmission of beacon signals inside the D2D discovery zone of the D2D region. At block 412, UEs receive the beacon signals and determine the quality of the D2D links.

Interference Management

One possible problem that would have to be avoided in an embodiment of the invention is interference with other communications. If a UE is communicating in a D2D mode with another UE, such a communication should not affect other UEs within the cell. In addition, communication from an eNB to a UE should not affect a D2D cluster. There are several possible approaches to manage interference between a D2D link and traditional eNB-UE links.

In one embodiment, a new D2D inter-cell interference coordination ("DICIC") scheme to enable efficient D2D operation when overlaid with the cellular network may be introduced. The DICIC scheme may include new enhancements to the existing inter-cell interference coordination ("ICIC") or enhanced inter-cell interference coordination ("eICIC") mechanisms that were originally used for Macro-Pico and Macro-Femto heterogeneous networks. A new D2D-Blank sub-region (DBS) may be defined to help interference coordination/mitigation between the cell area and the D2D network or D2D clusters. The DBS may consist of a subset of the available cellular resources within the cellular/D2D network for interference coordination/mitigation purposes between the cellular and D2D networks. For example, the DBS may consist of a subset of carriers, subset of frames or subframes, subset of resource blocks, or combinations thereof. Within the DBS, the cellular network may need to reduce the transmission power or blank out the cellular transmission to mitigate interference to D2D cluster(s). Only a very limited amount of information is sent in the DBS. In such a manner, the D2D cluster can transmit and receive information during the DBS without interference from the macro eNB or a pico eNB. The DBS may be overlapped with or be different from the almost blank subframes (ABS). If the D2D transmission region overlaps with DL data transmission from the serving eNB, the eNB may use the eICIC mechanism of ABS to reduce interference in those D2D subframes.

In an alternative embodiment, the ICIC method may be used where the serving station may reduce its transmission power. This reduction in transmission power results in less interference with D2D clusters. Additionally, the D2D sub-region and ABS subframes may be used jointly for interference coordination among different heterogeneous and D2D network combinations. For example, they may be used in a network with Macro, Pico, and D2D components, or a network with Macro, Femto, and D2D. In such a situation, an ABS would be used for one portion of the cell and a DBS would be used by D2D clusters.

In another embodiment, to perform interference management for the D2D overlay network, the network can classify a D2D user cluster as either (1) a "highly-interfered (HI)" cluster or (2) a "non highly-interfered (NI)" D2D user cluster. The HI clusters may contain D2D users under more severe interference from the macro network, e.g., close to the eNB or close to other D2D clusters. The NI clusters may be D2D users under lower interference from the Macro network. The network may use DBS for HI clusters and non-blanked resources (i.e. non-DBS) for NI clusters. The network can also consider using shared resources for NI clusters and dedicated resources (e.g., D2D subframes) for HI clusters. The definition of a highly interfered cluster and a non highly-interfered cluster may vary as technology changes that allows devices to operate in closer proximity to each other.

In another embodiment, it is beneficial to control the transmission power of the UEs to minimize the impact on eNB-UE links. It may not be necessary to use a high-power signal because of the proximity of D2D devices. Therefore, a lower-power signal may be used for D2D transmissions. This serves both to improve the battery life of the UEs as well as to reduce interference with other UEs and with the eNB. In current LTE specification the power control mechanism is applied for communication in UL. According to this method the UE transmit power adjustment depends on path loss between UE and eNB where depending on configuration settings the full or partial path loss compensation can be applied. When power control is applied for D2D communication it may take into account more factors such as: path loss to serving eNB, the level of inter-cell interference and path loss between UEs that will be involved into D2D communication.

D2D Measurement Sets

The optimal allocation of D2D transmission regions may require the definition of multiple measurement sets. Those sets may be also used to assist in the configuration of the D2D transmission region and resources to be used by each D2D cluster in the cell area. During D2D cluster establishment, the serving eNB may request the D2D coordinator or associated D2D devices to perform different measurements and analyze the impact from inter-cell interference on D2D performance. For instance, the DL and/or UL measurement set may be established to separately analyze the impact from DL and UL inter-cell and intra-cell interference. Additional measurement sets may be established to measure interference level for the cases of eICIC operation when ABS is enabled. Besides the described measurements sets, the D2D cluster measurement sets may be also defined to minimize the impact of D2D clusters on each other during normal network operation.

The following examples pertain to further embodiments.

In one embodiment, a method for reducing interference in a device-to-device cluster operating within a Long Term Evolution (LTE) cell may comprise: defining a device-to-device region within the LTE frame structure; defining a device-to-device blank sub-region (DBS) within the device-to-device region. The device-to-device cluster comprises a plurality of User Equipment (UEs) configured to communicate directly to another UE; the DBS comprises a subset of the available resources within the LTE cell; during the defined DBS, the eNB associated with the LTE cell transmits minimal information; and during the defined DBS, the plurality of UEs are configured to transmit information directly to another UE.

In another embodiment, the subset of available resources comprises one or more of the following: a subset of carriers; a subset of frames or subframes; and a subset of resource blocks or resource elements. In another embodiment, the DBS overlaps with an almost blank subframe (ABS). In another embodiment, prior to defining a DBS, determining the interference within the device-to-device cluster, wherein if interference is above a predetermined level, it is labeled "highly interfering". If the device-to-device cluster is "highly interfering," device-to-device cluster may be restricted to transmit device-to-device information only during a DBS. Otherwise, a device-to-device cluster is allowed to transmit device-to-device information outside of the DBS.

In another embodiment, prior to defining a DBS, determining the interference within the device-to-device cluster. Then, the impact of the interference on serving and neighbor cells is determined. If the device-to-device cluster is "highly interfering," the device-to-device cluster is restricted to the use of dedicated resources. Otherwise allowing the device-to-device cluster to use shared resources.

In another embodiment, a method for connecting user equipment (UE) to a device-to-device cluster comprising: sending, from a UE, a message indicating a desire to join a device-to-device cluster. The message may comprise a beacon transmission interval, a control transmission interval, and a data transmission interval. The UE is configured to send beacon information during the beacon transmission interval. The UE may further be configured to send control and management information during the control transmission interval. The UE may further be configured to send data during the data transmission interval.

In another embodiment, an apparatus configured to coordinate a Device-to-Device cluster with an evolved NodeB (eNB) may comprise: an organizer configured to organize Device-to-Device clusters; a coordinator configured to coordinate transmission on Device-to-Device links within a Device-to-Device cluster; a second coordinator configured to coordinate transmission between the Device-to-Device cluster with the eNB; and a processor configured to establish a Device-to-Device connection. The apparatus may further comprise a transceiver configured to report to the eNB. The apparatus may further comprise a transceiver configured to broadcast, multicast, and data hop to Device-to-Device clusters.

In another embodiment, a method performed by an evolved NodeB for allocating resources in an LTE/Device-to-Device network may comprise: allocating a set of resources to Device-to-Device clusters; broadcasting information regarding the allocation; wherein said set of resources is selected from: a set of resource blocks within one carrier; a set of frames or subframes; and a combination of resource blocks and sets of frames/subframes.

In another embodiment, a method performed by an eNB to allow devices to operate in a device-to-device mode may comprise: allocating a subset of frame resources to a device-to-device region; allocating a discovery zone within the device-to-device region; and broadcasting device-to-device region configuration information including the subset of frame resources and the discovery zone. The discovery zone comprises a set of subframes within a frame.

In another embodiment, a method performed by a first user equipment to operate in a device-to-device mode may comprise: receiving region configuration information, including a subset of frame resources and a discovery zone from an eNB; configuring the user equipment based on the received region configuration information; and broadcasting a beacon signal within the discovery zone to allow a second user equipment to find the first user equipment. The discovery zone may comprise one or more subframes with a frame.

In another embodiment, a method of conserving power in a first user equipment operating in a device-to-device mode may comprise: determining if data being transmitted by the user equipment is being sent directly to a second user equipment; and using a low power transmission mode to transmit data directly to the second user equipment. The method may also comprise using a high power transmission mode to transmit data to an evolved Node B.

The method may further comprise: determining the path loss between the first user equipment and the second user equipment; and adjusting the power used in the low power transmission mode based on the path loss. The method may further comprise determining the level of inter-cell interference between the first user equipment and the second user equipment; and further adjusting the power used in the low power transmission mode based on the level of inter-cell interference.

In another embodiment, a computer program product comprising a computer usable medium having a computer readable program code embodied therein, said computer readable program code adapted to be executed to implement a method for allocating resources in an LTE/Device-to-Device network. The method comprises: allocating a set of resources to Device-to-Device clusters; broadcasting information regarding the allocation; wherein said set of resources is selected from: a set of resource blocks within one carrier: a set of frames or subframes; and a combination of resource blocks and sets of frames/subframes.

In another embodiment, the method to be executed further comprises: allocating a subset of frame resources to a device-to-device region; allocating a discovery zone within the device-to-device region; and broadcasting device-to-device region configuration information including the subset of frame resources and the discovery zone.

In another embodiment, a system for implementing device-to-device communications in a Long Term Evolution (LTE) cell may comprise: an evolved Node B configured to define a device-to-device region within an LTE frame structure; define a device-to-device blank sub-region (DBS) within the device-to-device region; and a plurality of User Equipment (UEs) configured to communicate directly to another UE. The DBS comprises a subset of available resources within the LTE cell; within the defined DBS, the evolved Node B transmits minimal information; and within the defined DBS, the plurality of UEs are configured to transmit information directly to another UE.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method for reducing interference in a device-to-device cluster operating within a Long Term Evolution (LTE) cell, said method comprising:
   defining a device-to-device region within an LTE frame structure;
   defining a device-to-device blank sub-region (DBS) within the device-to-device region; wherein
   the device-to-device cluster comprises a plurality of User Equipment (UEs) configured to communicate directly to another UE;
   the DBS comprises a subset of available resources within the LTE cell;
   within the defined DBS, an evolved Node B (eNB) associated with the LTE cell transmits minimal information; and
   within the defined DBS, the plurality of UEs are configured to transmit information directly to another UE.

2. The method of claim 1 wherein the subset of available resources comprises one or more of the following:
   a subset of carriers;
   a subset of frames or subframes; and
   a subset of resource blocks or resource elements.

3. The method of claim 1 wherein said DBS overlaps with an almost blank subframe (ABS).

4. The method of claim 1 further comprising:
   prior to defining a DBS, determining the interference within the device-to-device cluster, wherein if interference is above a predetermined level, it is labeled "highly interfering";
   if the device-to-device cluster is "highly interfering," restricting the device-to-device cluster to transmit device-to-device information only during a DBS; and
   otherwise allowing a device-to-device cluster to transmit device-to-device information outside of the DBS.

5. The method of claim 1 further comprising:
   prior to defining a DBS, determining the interference within the device-to-device cluster;
   determining the impact of the interference on serving and neighbor cells;
   if the device-to-device cluster is "highly interfering," restricting the device-to-device cluster to the use of dedicated resources; and
   otherwise allowing the device-to-device cluster to use shared resources.

6. A system for implementing device-to-device communications in a Long Term Evolution (LTE) cell comprising:
   an evolved Node B configured to:
      define a device-to-device region within an LTE frame structure;
      define a device-to-device blank sub-region (DBS) within the device-to-device region; and
   a plurality of User Equipment (UEs) configured to communicate directly to another UE; wherein,
      the DBS comprises a subset of available resources within the LTE cell;
      within the defined DBS, the evolved Node B transmits minimal information; and
      within the defined DBS, the plurality of UEs are configured to transmit information directly to another UE.

7. The system of claim 6 wherein the subset of available resources comprises one or more of the following:
   a subset of carriers;
   a subset of frames or subframes; and
   a subset of resource blocks or resource elements.

8. The system of claim 6 wherein said DBS overlaps with an almost blank subframe (ABS).

9. The system of claim 6 further comprising:
   prior to defining a DBS, determining the interference within the device-to-device cluster, wherein if interference is above a predetermined level, it is labeled "highly interfering";
   if the device-to-device cluster is "highly interfering," restricting the device-to-device cluster to transmit device-to-device information only during a DBS; and
   otherwise allowing a device-to-device cluster to transmit device-to-device information outside of the DBS.

10. The method of claim 6 further comprising:
   prior to defining a DBS, determining the interference within the device-to-device cluster;
   determining the impact of the interference on serving and neighbor cells;
   if the device-to-device cluster is "highly interfering," restricting the device-to-device cluster to the use of dedicated resources; and
   otherwise allowing the device-to-device cluster to use shared resources.

* * * * *